United States Patent [19]
Yamamoto

[11] Patent Number: 5,991,236
[45] Date of Patent: *Nov. 23, 1999

[54] METHOD OF MEASURING BURIED OBJECTS, GEOLOGICAL FORMATIONS AND SEDIMENT PROPERTIES

[75] Inventor: Tokuo Yamamoto, 12200 SW. 89th Ave., Miami, Fla. 33176

[73] Assignees: Tokuo Yamamoto, Miami, Fla.; Kawasaki Steel Corporation, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,747

[22] Filed: Apr. 3, 1997

[51] Int. Cl.[6] .............................. G01V 1/28; G01V 1/38; G01V 1/40
[52] U.S. Cl. ................................ 367/41; 367/21; 367/39; 364/421
[58] Field of Search ................................. 367/21, 39, 41, 367/56; 364/421

[56] References Cited

U.S. PATENT DOCUMENTS

| | | | |
|---|---|---|---|
| 4,933,916 | 6/1990 | May et al. | 367/125 |
| 4,974,212 | 11/1990 | Sherman | 367/21 |
| 5,193,077 | 3/1993 | Weiglein et al. | 367/21 |
| 5,315,562 | 5/1994 | Bradley et al. | 367/89 |
| 5,406,530 | 4/1995 | Yamamoto | 367/39 |
| 5,424,999 | 6/1995 | Manin | 367/21 |
| 5,646,623 | 7/1997 | Walters et al. | 342/129 |

OTHER PUBLICATIONS

Yamamoto, T; Jour. Acoust. Soc. America, vol. 99, #2, pp. 866–879, Feb. 1996; abstract only herewith.

Rogers et al, Jour. Acoust. Soc. of America, vol. 93, #4, p.1, pp. 1747–1761, Apr. 1993; abst. only herewith.

Rogers et al, 63 Annu. Mtg SEG Int., Sep. 30, 1993, pp. 531–535, abst. only herewith.

Turgut et al, Geophysics, vol. 53, #8, pp. 1056–1067, Aug. 1988; abst. only herewith.

Yamamoto et al, Geophysics, vol. 60, #6, pp. 1634–1645, Dec. 1995; abst. only herewith.

Hunt et al, Ultrasound in Medicine & Beology, vol. 21, #3, pp. 329–341, 1995; abst only herewith.

Yamamoto, T. Acoustic scattering in the ocean from velocity and density fluctuations in the sediments, J. Acoust. Soc. Am. 99 (2), Feb. 1996, pp. 866–879.

Yamamoto, T. Velocity variabilities and other physical properties of marine sediments measured by crosswell acoustic tomography, J. Acoust. Soc. Am. 98 (4), Oct. 1995, pp. 2235–2248.

Rogers, A. et al *The High Resolution 3–D Seismic Survey System "Kite"*, Sep. 1993, pp. 531–535.

Turgut, A. et al Synthetic seismograms for marine sediments and determination of porosity and permeability, Geophysics, vol. 53, No. 8, Aug. 1988, pp. 1056–1067.

Yamamoto, T. et al Imaging the permeability structure of a limestone aquifer by crosswell acoustic tomography, Geophysics, vol. 60, No. 6, Nov.–Dec. 1995, pp. 1634–1645.

Yamamoto, T. et al Acoustic wave propagation through porous media with arbitrary pore size distributions, J. Acoust. Soc. Am. 83 (5), May 1988, pp. 1744–1751.

*Primary Examiner*—Nelson Moskowitz
*Attorney, Agent, or Firm*—Austin R. Miller

[57] ABSTRACT

An apparatus and method are provided for detecting buries objects, geological formations or sediment properties by transmitting an acoustic signal and receiving a scattered signal. An acoustic source and an array of receivers are used to correlate the scattered signal with the transmitted signal.

17 Claims, 9 Drawing Sheets

375 - 1575 Hz data, Amcor 6010

Inversions of Cross-Sections AB (z-y) and AD (z-x)

Inversions of Cross-Sections AB (z-y) and AD (z-x)

Inversions of Cross-Sections AB (z-y) and AD (z-x)

BBS (dB) as a function of grazing angle and azimuth
Ft. Pierce, FL site#1 15kHz

Measured backscatter compared with the Yamamoto theory of acoustic scatter from sediment density and sound speed variabilities.

5,991,236

METHOD OF MEASURING BURIED OBJECTS, GEOLOGICAL FORMATIONS AND SEDIMENT PROPERTIES

This invention was made under a grant from the Office of Naval Research under Contract No. N00014-89-J-1146, entitled "Measurement of Acoustic Propagation/Scattering in Shallow Ocean."

BACKGROUND OF THE INVENTION

This invention relates to a non-destructive method of measuring buried objects, geological formations and sediment properties. More particularly, this invention relates to transmitting signals from a source and receiving with receivers the signals scattered by buried objects, geological formations and sediment properties. A device for carrying out the measuring method is also provided.

FIELD OF THE INVENTION

The focus of naval research has shifted from deep water to shallow water and the littoral zone where amphibious operations and mine counter-measures are among the most critical concerns. Shallow water is bottom limited so that conventional acoustic sonars are not very useful. Understanding of acoustic wave propagation and scattering from sediments in shallow water and eventual development of shallow water sonars are very important research areas.

Prior art technology relies on seismic reflection and coring. Seismic reflection is often time consuming and may result in marginal resolution and accuracy. Coring is accurate but is not practical in many applications. A fast and relatively accurate survey method of shallow water sediments is still needed.

The shear strength of sediment is helpful to estimate bearing capacities of littoral zone sediments for amphibious operations and for mine burial. Also, density, sound speed and attenuation variabilities within the sediments are helpful for detection of mines by sonar.

U.S. Pat. No. 5,406,530 to Yamamoto, incorporated herein by reference, discloses a non-destructive method of measuring physical characteristics of sediments to obtain a cross-sectional distribution of porosity and permeability values and variations, and of shear modulus and shear strength. Hydrophones are placed in one bore hole and a pseudo-random binary sequence (PRBS) code generator as a source of seismic energy is placed in another bore hole. Seismic wave characteristics are measured in paths extending from the source to the hydrophones, using cross-bore tomography. The method disclosed in U.S. Pat. No. 5,406,530 has many advantages.

Breaking waves and long shore and cross shore currents change seabed topography and composition of sediments rapidly, even overnight. Hostile environmental forces and shallow water make it difficult to measure sediment composition and structure. An accurate and swift method of measuring sediment composition and structure within the seabed in the littoral zone is urgently needed.

Improved methods for measuring the temporal and spatial changes of the sediment structure in the littoral zone (the biogeographic zone between the high- and low-water marks) are needed. Such changes were not possible to measure using prior art methods.

OBJECTS OF THE INVENTION

It is an object of this invention to provide a method for measuring buried objects, geological formations and sediment properties.

It is another object of this invention to provide an apparatus for measuring buried objects, geological formations and sediment properties.

Other objects of this invention will be clear in view of the description and figures.

SUMMARY OF THE INVENTION

It has been discovered that sound waves propagated through sediments are scattered by buried objects such as mines, geological features such as faults, and fluctuations of sediment properties such as density and sound speed. It has further been discovered that the scattered wave field is calculated mathematically from density variations and sound speed distributions. The locations and intensities of the scatterers are calculated from the scattered wave field.

The method of this invention includes several steps to locate a buried object, geological feature or sediment property fluctuation in the earth. An array of receivers is placed in the earth or in a body of water such as the ocean. An acoustic source is placed in the earth or in a body of water for transmission of signals. The signals received by the array of receivers are recorded. The received signals and the transmitted signals are correlated to measure the arrival times of scattered waves. A space-time wave field diagram is generated using the correlated signals. The scatter(s) in the space-time wave field diagram are then located.

DRAWINGS

The file of this patent contains at least one drawing executed in color. Copies of this patent with color drawings will be provided by the Patent and Trademark Office upon request and payment of the necessary fee.

DESCRIPTION OF THE INVENTION

A physically consistent theory of acoustic scattering based on sediment density and sound speed variabilities has been discovered. This theory is described in the paper entitled "Acoustic Scattering in the Ocean from Velocity and Density Fluctuations in the Sediments," authored by Dr. Tokuo Yamamoto and published in The Journal of the Acoustical Society of America, Vol. 99, No. 2, Pt. 866, 879 1996.

It has been discovered that density variabilities in sediments are a major mechanism of acoustic scattering in shallow water. A unique sonar apparatus and method have also been discovered for making accurate and fast measurements of bottom backscatter.

Figure 1:
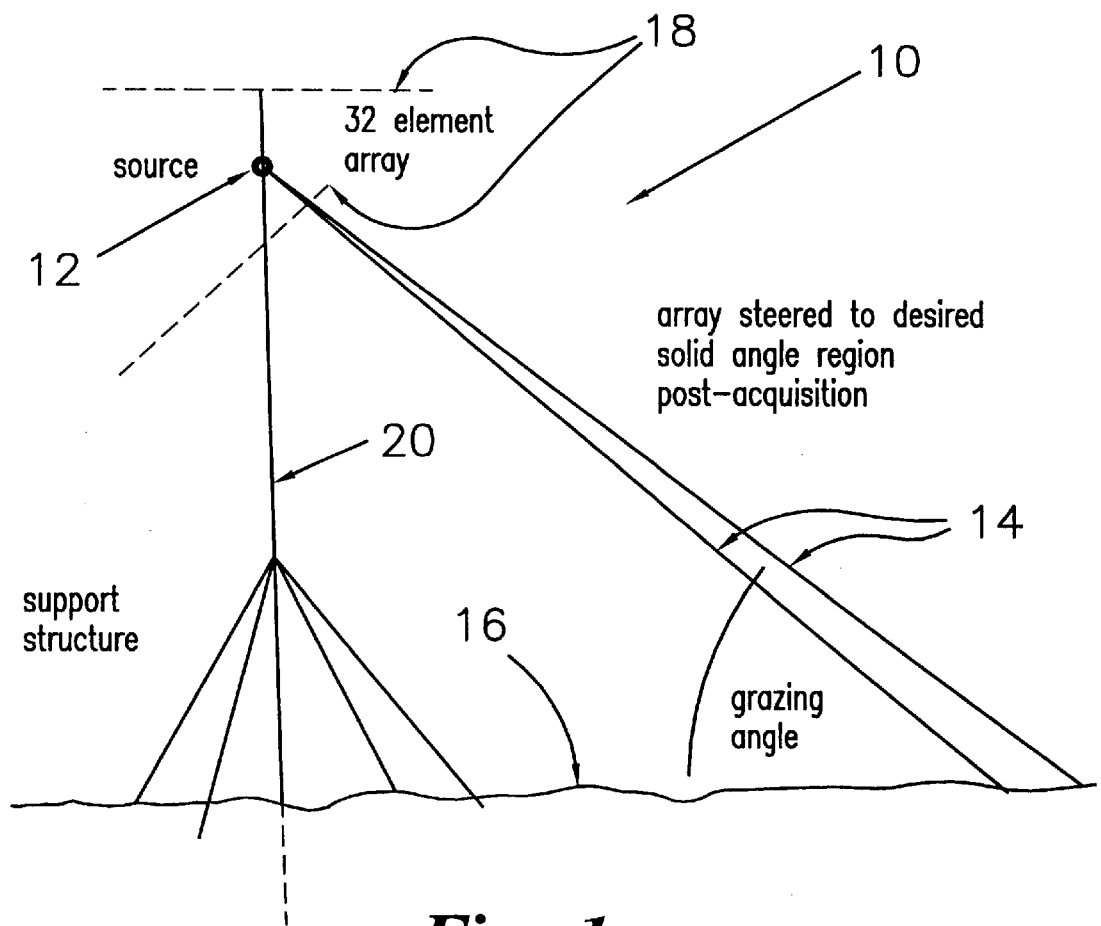
FIG. 1 illustrates one embodiment of an apparatus according to this invention.

One embodiment of a sediment classification sonar is shown in FIG. 1. The sonar embodiment shown in FIG. 1 measures acoustic scattering from sediments in the littoral zone as well as in the shallow and deep water substantially instantaneously. It is this backscatter that is uniquely related to the density, sound speed, shear strength and attenuation structure within the sediments. The sediment structure is inverted from the bottom backscatter data.

Because the scattered wave field from scatterers are usually very weak, it has in the past been considered unfeasible to locate the scatterers using active sources as opposed to passive sources such as strong earthquakes. A pseudorandom binary sequence (PRBS) signal such as the one described in U.S. Pat. No. 5,406,530, incorporated herein by reference, is preferably used to measure the weak scattered wave field from buried objects or a distant fault.

Referring to FIG. 1, a sonar 10 is provided with a source 12 for generating and transmitting acoustic signals 14 toward a sediment 16. Sonar 10 also includes arrays of receivers 18 for receiving the acoustic signals scattered in the sediment 16. The source 12 and receiver arrays 18 are mounted on a support 20 which, in this embodiment, rests on sediment 16 at the bottom of a water body.

Source 12 is optionally a 160 dB at 15 kHz source. More preferably, source 12 is made of a 200 dB (5–60 kHz) piezoelectric source. Receiver arrays 18 are preferably formed from two orthogonal 32-channel hydrophone arrays (total 64 channels) and a real time digital array processor. More preferably, three orthogonal 32-channel hydrophone arrays (96 channels) are provided.

The sonar 10 preferably measures the acoustic bottom backscatter at frequencies between 7.5 and 15 kHz vs. grazing angle and azimuth within a 100 m radius substantially instantaneously. The acoustic backscatter data is optionally inverted for the density, sound speed, attenuation and shear strength structure of the sediments within a volume of 100 m radius×10 m depth, for example.

The sonar 10 is optionally deployed on the sea floor (as shown in FIG. 1) or is mounted on moving platforms like surface ships, submarines, ROV's and AV's.

A 200 dB broadband (5–60 kHz) piezoelectric source, three 32-channel hydrophone arrays, and conductor cable are available from International Transducer Corporation. A real time digital signal processor for 96-channel signals for stacking and beamforming operation is available from Tropical Electronics Inc., a Division of Yamamoto Engineering Corporation. The array processor system preferably consists of a 12 bit 300 kHz per channel A/D board for 96-channels, boards for real time stacking at a maximum of 300 kHz, and real time cross-correlation for 96-channels.

The method of this invention uses a sonar such as the embodiment illustrated in FIG. 1 to locate buried objects, geological features or sediment property fluctuations in the earth. One or more arrays of receivers such as arrays 18 are placed in the earth or in a body of water such as the ocean as shown in FIG. 1, for example. An acoustic source such as source 12 is placed in the earth or in a body of water for transmission of signals.

The source is preferably positioned at a location corresponding to the array or arrays of receivers, such as between the arrays as shown in FIG. 1, for transmission of acoustic signals. Other locations for the source, optionally away from the arrays, is contemplated. The relative arrangement of the source and the arrays illustrated in FIG. 1 is a preferred "monostatic arrangement" for measurement of acoustic backscattering. The sonar illustrated in FIG. 1 is optionally modified to measure forward scattering by moving the source to a location remote from the receivers in a "bistatic arrangement."

The signals received by the receivers are recorded. The received signals and the transmitted signals are correlated to measure the arrival times of scattered waves. A space-time wave field diagram is generated using the correlated signals and known beamforming techniques. The scatter(s) in the space-time wave field diagram are then located.

The image obtained by the sonar system is preferably enhanced by 286 times by using a PRBS source. The range of survey is also preferably increased by 286 times by use of a PRBS source. By using more averaging and longer PRBS code length, the image enhancement and the range of survey can be increased indefinitely, if desired. A conventional source such as a single shot source or other coded signals such as frequency modulated (FM) sweep is optionally used in the alternative.

The embodiment of the offset cross arrays of receivers shown in FIG. 1 gives a sharp directional resolution. The directional resolution can be further improved by increasing the number of receivers on the arrays.

Not only buried objects but also sediment properties and geological formations such as faults can be measured by this invention. The sonar of this invention also provides information on the shear strength, density, sound speed variabilities within the sediments in the littoral zone and in the shallow and deep waters.

EXAMPLE 1

Figure 2:
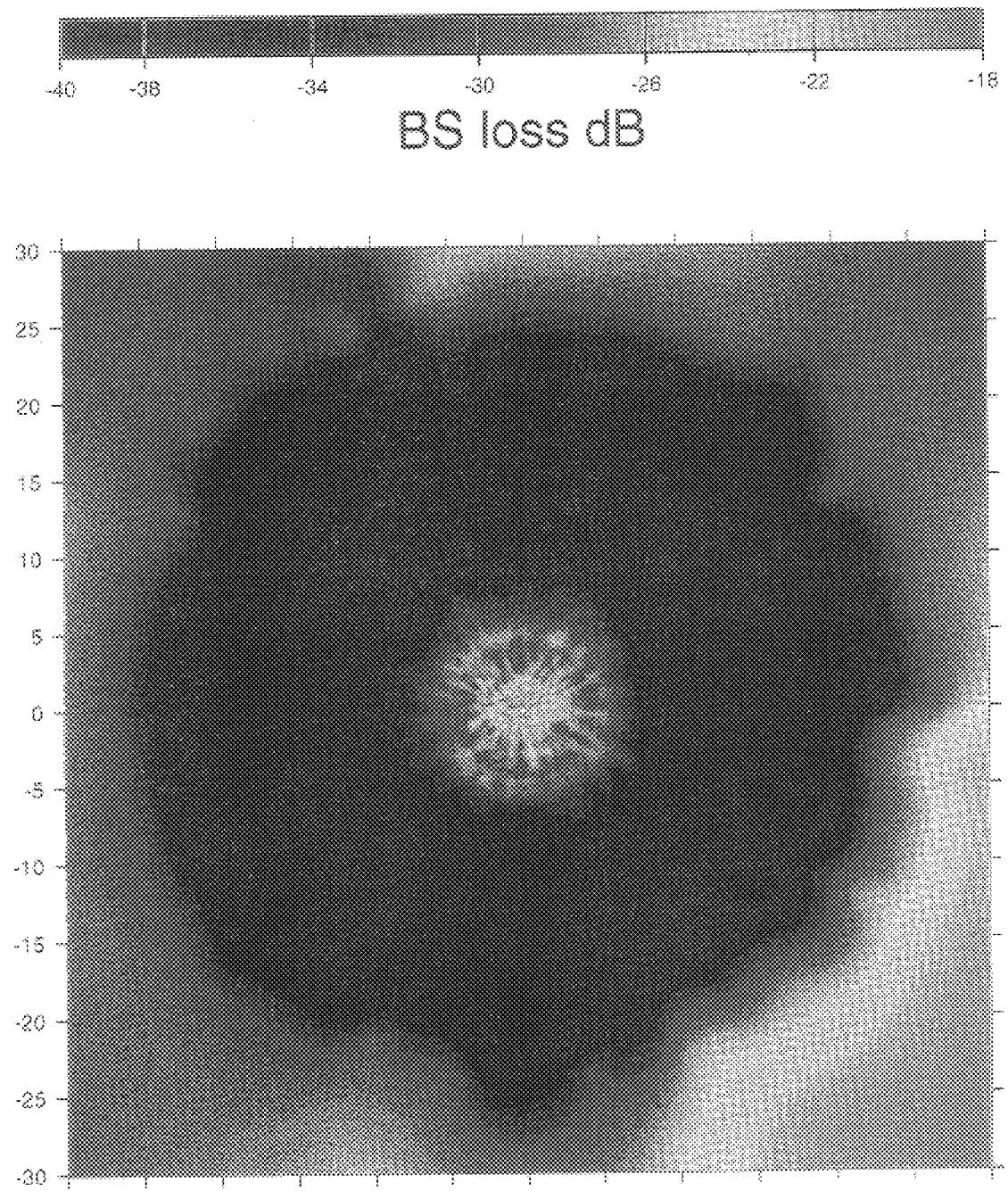
FIG. 2 illustrates an example of a space-time wave field diagram.
Figure 3:
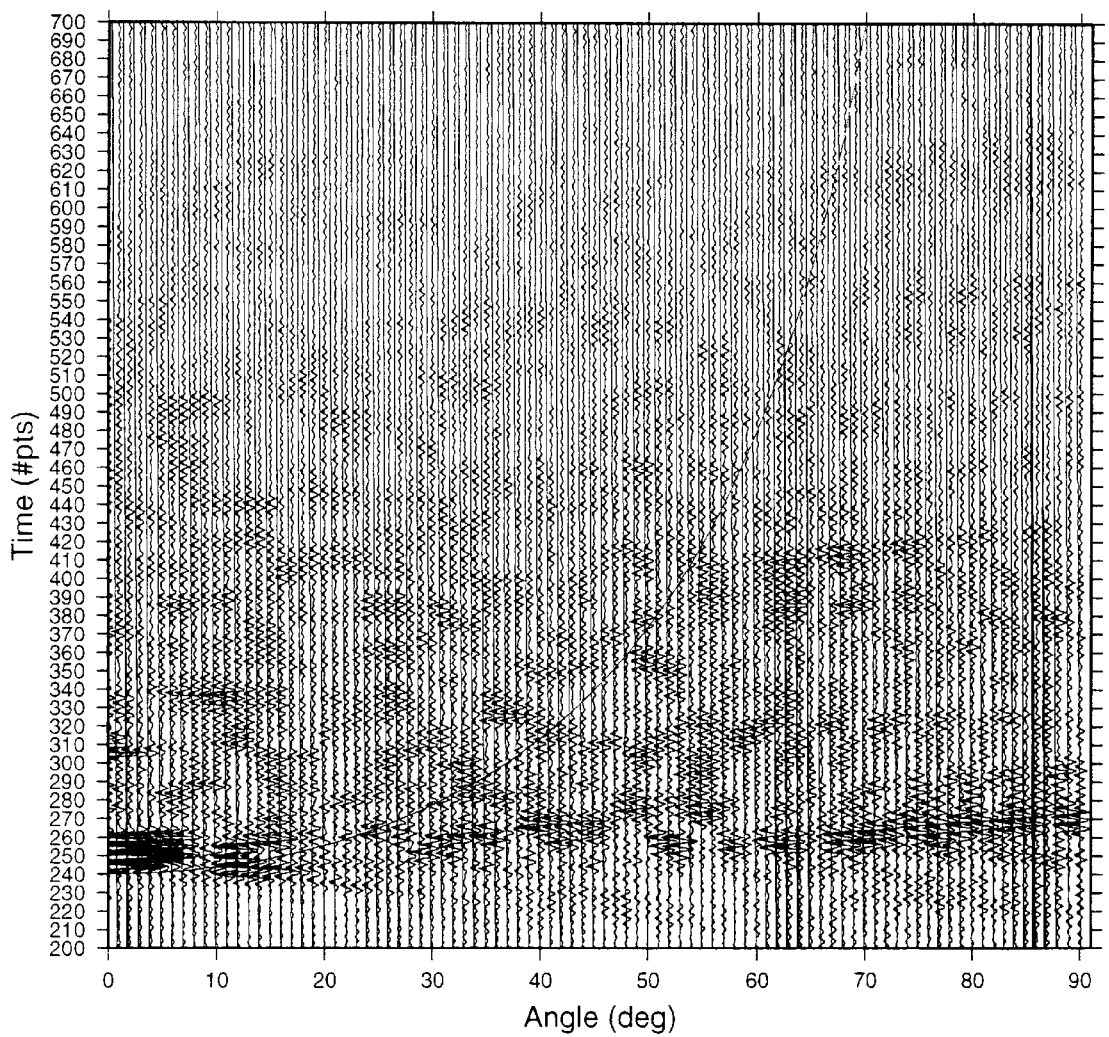
FIG. 3 illustrates a vertical cross-section through a seabed generated according to an embodiment of this invention.
Figure 4:
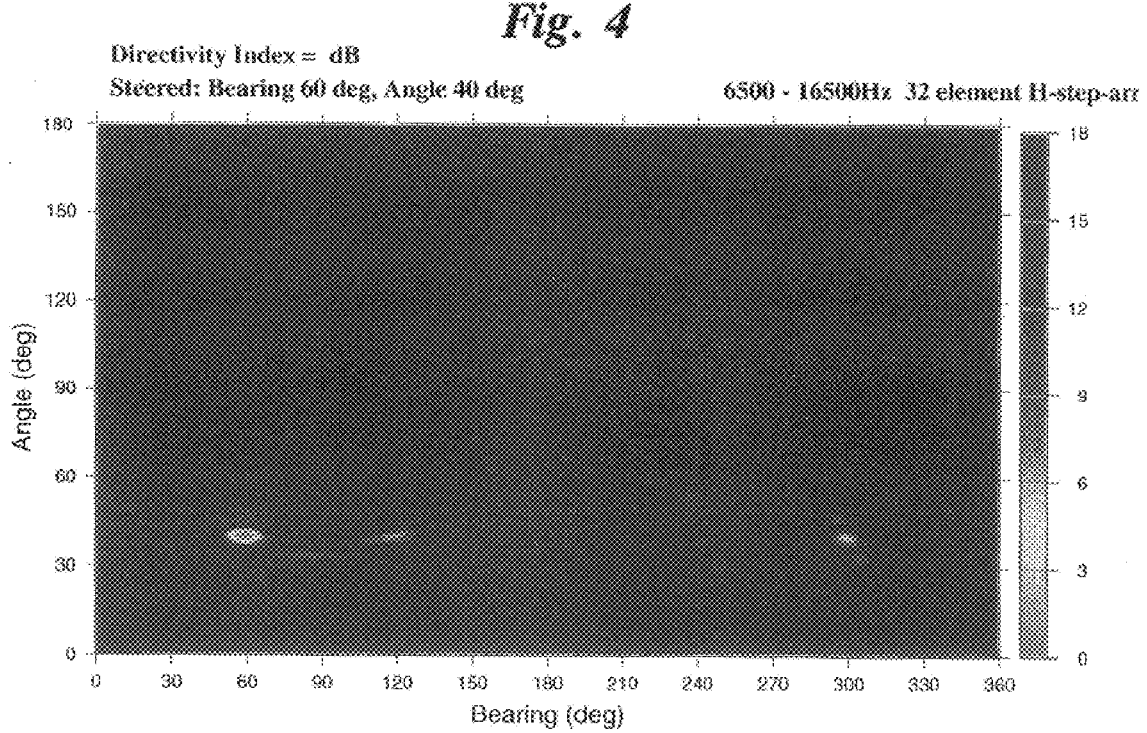
FIG. 4 illustrates directional resolution obtained by an embodiment of the method according to this invention.

FIG. 2 shows an example of a space-time scattering diagram obtained from a sea experiment performed at Ft. Pierce, Fla. A sonar embodiment similar to the one shown in FIG. 1 was used. An average of twenty 4095 cycle PRBS sequences at 10 kHz was used to generate a scattering diagram. The plots were time gated so that the horizontal plane about 1 m below the sea floor, 360 degrees around the offset cross array, was imaged. Strong scatterers (buried objects) are shown in light colored spots directly under the receiver array. A vertical cross-section through the seabed in the north direction is shown in FIG. 3. The vertical axis is the two way travel time (non dimensional) of the PRBS acoustic signal and the horizontal axis shows the incident angle. Many sediment layers are visible in the scattering diagram shown in FIG. 3. FIG. 4 illustrates the sharp directional resolution generated by the receiver arrays. Directional resolution is optionally improved by increasing the number of receivers.

EXAMPLE 2

Figure 5:
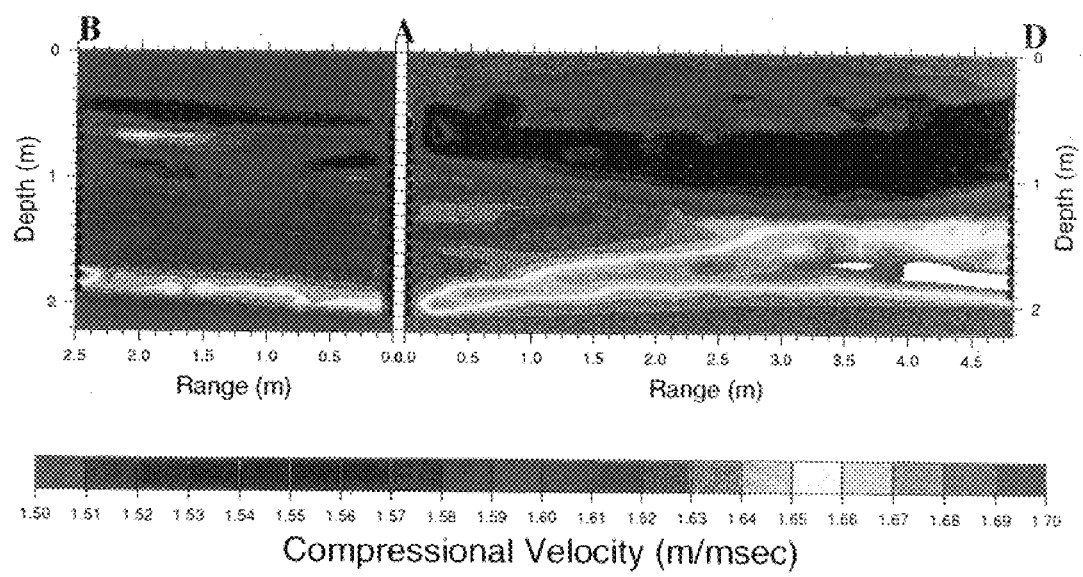
FIG. 5 illustrates a measured sound speed image of a silty bottom in shallow water.
Figure 6:
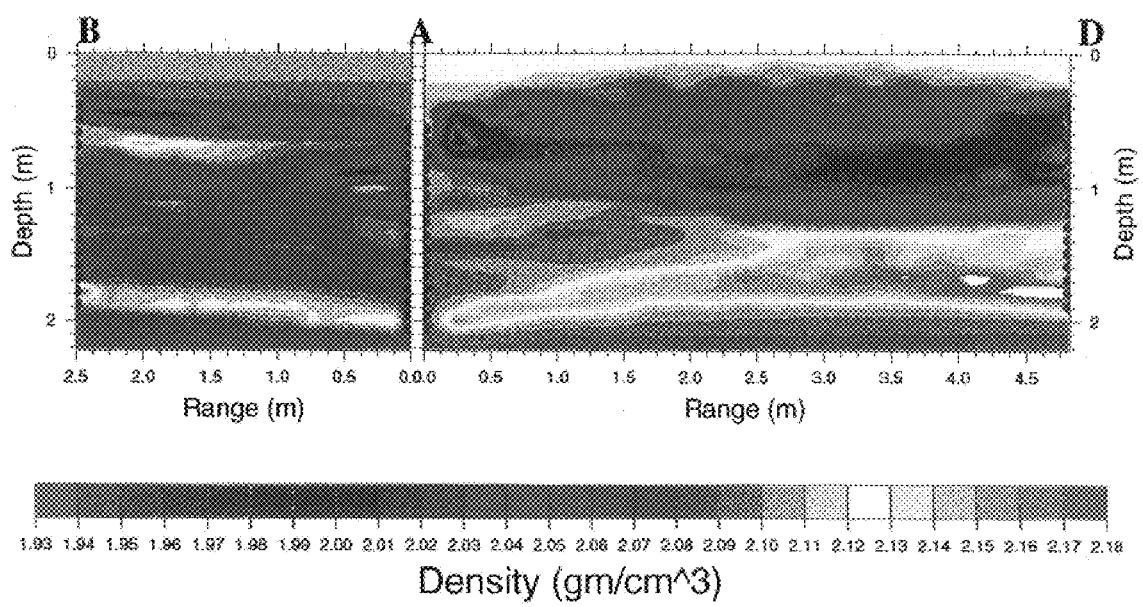
FIG. 6 illustrates a measured density image of a silty bottom in shallow water.
Figure 7:
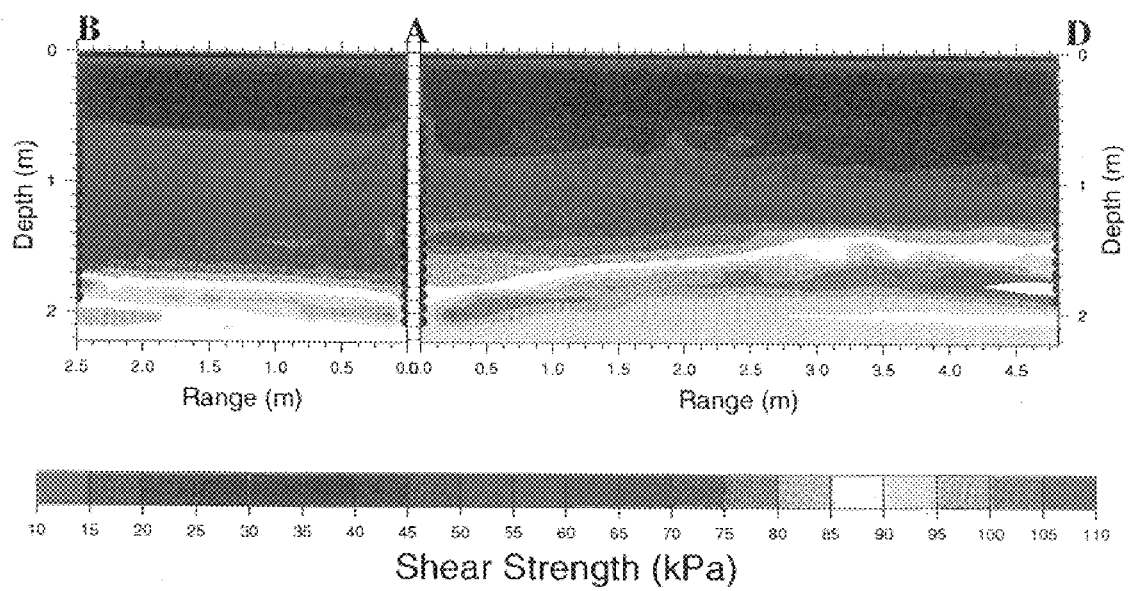
FIG. 7 illustrates a measured shear strength image of a silty bottom in shallow water.

A littoral zone sediment classification sonar in accordance with the embodiment shown in FIG. 1 was sea-tested by comparisons with direct measurements and with the results of crosswell tomography. The source used was a 160 dB at 15 kHz source. The acoustic bottom backscatter was measured at frequencies between 7.5 and 15 kHz with respect to grazing angle and azimuth within a 100 m radius, instantaneously. The acoustic backscatter data was inverted for the density, sound speed, attenuation and shear strength structure of the sediments with a volume of 100 m radius×10 m depth. The density, sound speed and shear strength images of the seabed sediments were captured at high resolution as shown in FIGS. 5 through 7 for a typical shallow water silty seabed at Florida Straits.

Figure 8:
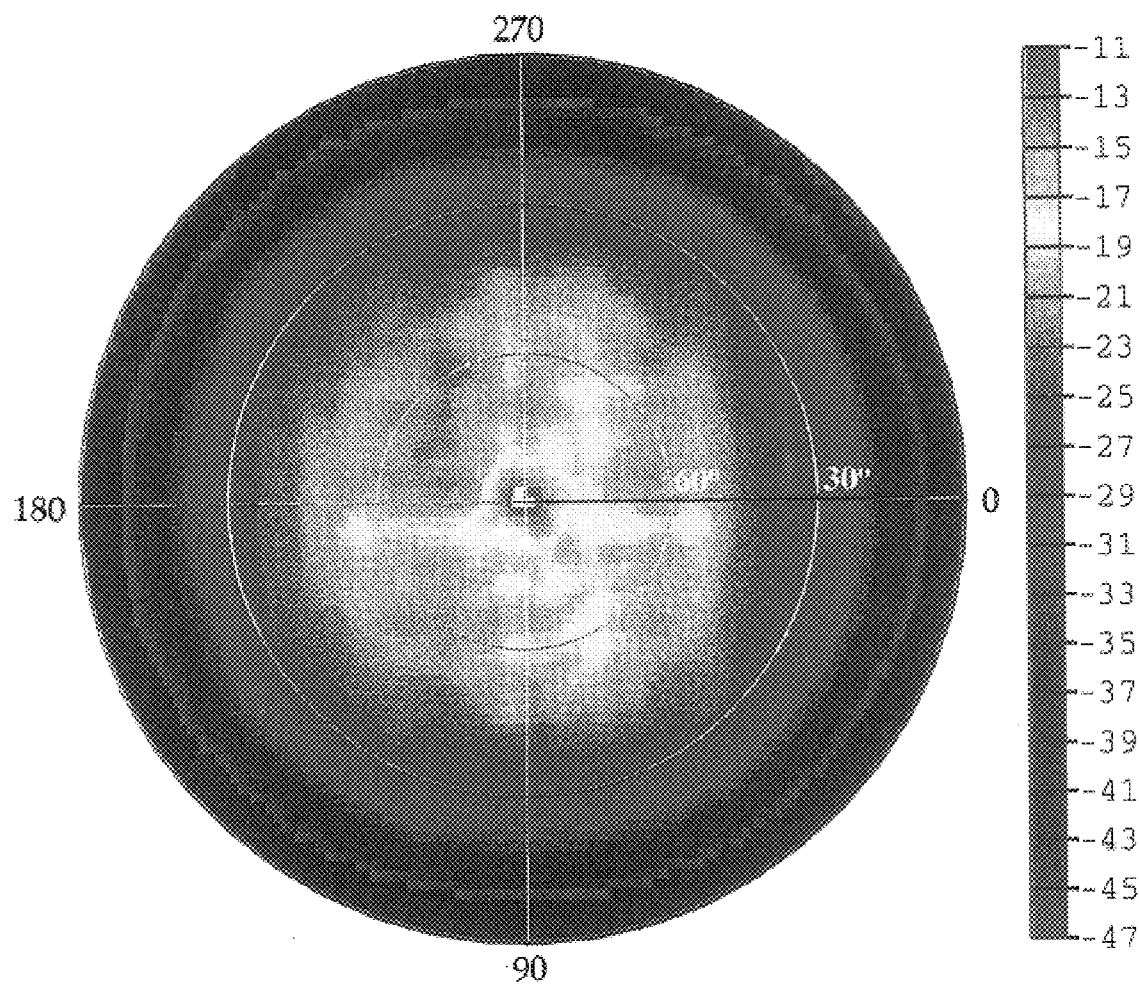
FIG. 8 illustrates a measured backscatter strength at a silty site in shallow water.
Figure 9:
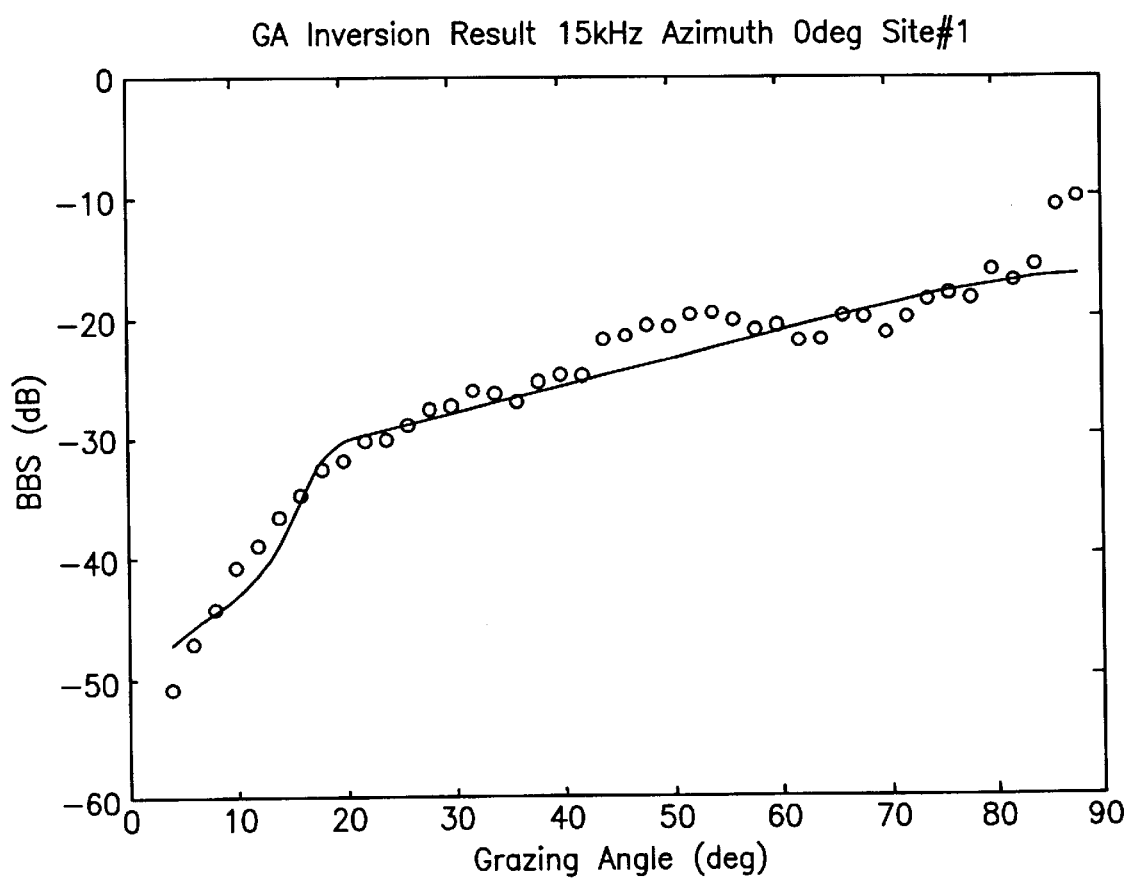
FIG. 9 illustrates measured backscatter as compared with acoustic scatter from sediment density and sound speed variabilities.

The measured bottom backscatter strength (BBS) at the silty bottom of Florida Straits is shown in FIGS. 8 and 9. The sediment structure was obtained by inverting the BBS data according to the Yamamoto theory described in the paper entitled "Acoustic Scattering in the Ocean from Velocity and Density Fluctuations in the Sediments," which is incorporated herein by reference. The sediment properties inverted from the BBS data were compared with those measured from crosswell tomography experiments in the following Table 1:

TABLE 1

Comparisons Between the Inverted and Measured Sediment Properties
Comparison of Forward and
Inverse modelling parameters Site #1 Bearing 0deg

| 2m section horizontal | Forward Model | Inversion |
|---|---|---|
| Freguency (Hz) | 15000 | 15000 |
| Sed. Sound Speed (m/s) | 1560 | 1567.86 |
| Attenuation (dB/m/kHz) | 0.3 | 0.331 |
| Aspect Ratio | 1, 3, 6 | 2.067 |
| Spectral Intensity | 7.98e-6 | 6.01e-4 |
| Spectral Exponent | 0.8526 | 0.865 |
| Azimuth (deg) | 0 | 146.6 |
| Dip (deg) | 0 | 0.49 |

Excellent agreement is shown between the two methods, confirming that the sediment structures of density, sound speed and shear strength of the seabed in shallow water and littoral zone is accurately measured by the sonar embodiment shown in FIG. 1.

What is claimed is:

1. A method of detecting buried objects, geological formations or sediment properties, said method comprising the steps of:
    (a) positioning at least one receiver array at a location in the earth or in a body of water, said receiver array comprising a plurality of receivers adapted to receive acoustic signals;
    (b) positioning an acoustic source at a location in the earth or in said body of water, said acoustic source being adapted to generate and transmit acoustic signals;
    (c) transmitting an acoustic signal from said acoustic source and into the earth to form one or more scattered signals upon impingement against said buried objects, geological formations or sediment properties;
    (d) receiving said scattered signals with said receiver array;
    (e) measuring the arrival time of said scattered signals at said receiver array by correlating said scattered signals received by said receiver array with said acoustic signal transmitted by said acoustic source;
    (f) generating a space-time wave field diagram based upon said correlating of said scattered signals; and
    (g) detecting the location of said buried objects, geological formations or sediment properties by locating the position of said scattered signals in said space-time wave field diagram.

2. The method defined in claim 1, wherein said positioning steps comprise positioning said receiver array in said body of water and positioning said acoustic source in said body of water.

3. The method defined in claim 1, wherein at least two receiver arrays are positioned in the earth or in said body of water and wherein said positioning steps comprise positioning said acoustic source substantially between two of said receiver arrays for measurement of acoustic backscattering.

4. The method defined in claim 1, wherein said positioning steps comprise positioning said receiver array at a location remote from said acoustic source for measurement of acoustic forward scattering.

5. The method defined in claim 1, wherein said measuring step comprises generating a space-time wave field diagram and said detecting step comprises locating said scattered signal in said space-time wave field diagram.

6. The method defined in claim 1, wherein said transmitting step comprises transmitting a pseudorandom binary sequence signal.

7. An apparatus for detecting buried objects, geological formations or sediment properties, said apparatus comprising:
    an acoustic source positioned at a location in the earth or in a body of water, said acoustic source being adapted to transmit an acoustic signal into the earth, wherein said acoustic signal is scattered by a buried object, a geological formation or a sediment property to form one or more scattered acoustic signals;
    at least one receiver array positioned at a location in the earth or in said body of water, said receiver array being adapted to receive said scattered acoustic signals; and
    means connected to said receiver array for measuring the arrival time of said scattered acoustic signals at said receiver array, said means being adapted to correlate said scattered acoustic signals received by said receiver array with said acoustic signal transmitted by said acoustic source; and
    a space-time wave field diagram generator connected to said means to produce a wave field diagram on which the position of said scattered acoustic signals are capable of being located.

8. The apparatus defined in claim 7, wherein said acoustic source is positioned in said body of water and said receiver array is also positioned in said body of water.

9. The apparatus defined in claim 7, wherein said apparatus comprises at least two receiver arrays and wherein said acoustic source is positioned substantially between two of said receiver arrays so that said receiver arrays receive backscattered signals.

10. The apparatus defined in claim 7, wherein said receiver array is positioned at a location remote from said acoustic source so that said receiver array receives forward scattered signals.

11. The apparatus defined in claim 7, wherein said acoustic source is mounted on a support adjacent to a surface of the earth.

12. The apparatus defined in claim 7, wherein said acoustic source comprises at least a 160 dB at 15 kHz source.

13. The apparatus defined in claim 12, wherein said acoustic source comprises at least a 200 dB piezoelectric source.

14. The apparatus defined in claim 7, wherein said receiver array comprises a plurality of hydrophones connected to an array processor.

15. The apparatus defined in claim 7, wherein said apparatus comprises at least two receiver arrays and wherein one of said receiver arrays is oriented to be substantially orthogonal to another one of said receiver arrays.

16. The apparatus defined in claim 7, wherein said apparatus comprises three of said receiver arrays.

17. The apparatus defined in claim 7, wherein said acoustic source is configured to transmit a pseudorandom binary signal.

* * * * *